US006666515B2

United States Patent
Asano et al.

(10) Patent No.: US 6,666,515 B2
(45) Date of Patent: Dec. 23, 2003

(54) SEAT RECLINER

(75) Inventors: Yasushi Asano, Kosai (JP); Hiroshi Matsuura, Hamamatsu (JP); Tetsuya Ohba, Toyohashi (JP)

(73) Assignee: Fujikiko Kabushiki Kaisha, Shizuoka (JP)

( * ) Notice: Subject to any disclaimer, the term of this patent is extended or adjusted under 35 U.S.C. 154(b) by 0 days.

(21) Appl. No.: 10/154,764

(22) Filed: May 23, 2002

(65) Prior Publication Data

US 2002/0175548 A1 Nov. 28, 2002

(30) Foreign Application Priority Data

May 24, 2001 (JP) ........................................ 2001-155659
May 24, 2001 (JP) ........................................ 2001-155749

(51) Int. Cl.$^7$ .............................. B60N 2/22; B60N 2/235
(52) U.S. Cl. ........................................ 297/366; 297/367
(58) Field of Search ................................ 297/367, 366, 297/368, 369

(56) References Cited

U.S. PATENT DOCUMENTS

| | | | | |
|---|---|---|---|---|
| 5,590,931 A | * | 1/1997 | Fourrey et al. | 297/366 |
| 5,881,854 A | * | 3/1999 | Rougnon-Glasson | 297/367 X |
| 6,085,386 A | * | 7/2000 | Blanchard et al. | 297/367 |
| 6,112,370 A | * | 9/2000 | Blanchard et al. | 297/367 |
| 6,312,053 B1 | * | 11/2001 | Magyar | 297/367 |

FOREIGN PATENT DOCUMENTS

| | | |
|---|---|---|
| EP | 0 024 976 A1 | 3/1981 |
| EP | 0 720 930 A1 | 7/1996 |
| FR | 1.347.823 | 11/1964 |
| FR | 2 626 154 | 7/1989 |
| JP | 8253063 | 10/1997 |
| JP | 11056514 | 9/2000 |

* cited by examiner

*Primary Examiner*—Anthony D. Barfield
(74) *Attorney, Agent, or Firm*—Kilpatrick Stockton LLP

(57) ABSTRACT

The seat recliner includes a first seat member. The seat recliner includes a second seat member rotatable relative to the first seat member. The seat recliner includes an input cam member for rotating relative to the first seat member. The seat recliner includes a pivot on the first seat member. The seat recliner includes a follower member for being actuated by the input cam member to lock the second seat member relative to the first seat member. The follower member includes a first side. The first side includes a tooth for meshing with the second seat member. The first side includes an engagement side pivotably engaging on the pivot. The follower member includes a second side in proximity to the engagement side. The seat recliner includes a pair of guides on the first seat member. Guides have the pivot interposed therebetween for cooperating with the pivot to pivotably support the follower member on the pivot. A guide has smaller rigidity than the pivot for retaining the second side.

Preferably, the seat recliner includes a reinforcement member interconnecting the pivot and the first seat member. The reinforcement member includes a first support face for supporting the follower member.

Preferably, the guide is spaced from the second side for retaining the second side under a force.

11 Claims, 11 Drawing Sheets

SEAT RECLINER

FIELD OF THE INVENTION

The present invention relates to a seat recliner which allows a seat back to be rotated relative to a seat cushion, and, more specifically, to one suitable for a vehicle such as an automobile.

DESCRIPTION OF RELEVANT ART

A conventional kind of a seat recliner has been known. The seat recliner includes a frame mounted to the base plate of a seat cushion. The recliner includes a lid mounted to an arm plate of a seat back. The frame and the lid are rotatable relative to each other. The frame includes a lock tooth with an external gear. The lid includes an internal gear formed on the inner peripheral face. The external and internal gears are meshed to prevent the relative rotation between the frame and the lid.

The frame includes a pivot for supporting the lock tooth. The lock teeth allow the external and internal gears to be meshed with each other.

The frame includes a guide for guiding the lock tooth to be pivoted on the pivot.

SUMMARY OF THE INVENTION

The pivot has a base, or a connecting portion with the frame, where maximum load occurs. The greater connecting area of the pivot and the frame is superior in strength. However, a greater connecting area causes the projecting length to be lowered. The contact area of the pivot with the lock tooth is reduced, lowering the pivot in strength.

Rotational force is converted into straight external force to be exerted on the lock tooth via the internal and external gears. The pivot and lid retain the lock tooth between them to lock with each other without rotating.

The greater the rigidity of the guide is to the external force, that is, the more difficulty with which the guide is resiliently deformed against the external force, the more securely the pivot is backed up, thus improving strength. However, when guide has greater rigidity than the pivot, the pivot starts to be deformed, while the guide is not deformed. Internal force is exerted on the pivot to be deformed. The exertion causes the pivot to be damaged. Thus, the providing of the guide to improve strength obtains insufficient effect.

The thickening of the lock tooth or the use of high quality material may improve the lock tooth in rigidity against the internal force. However, this deteriorates formability and causes high productive cost.

The invention is directed to a seat recliner, which improves a pivot in strength and reduces in productive cost.

The first aspect of the invention provides a seat recliner. The seat recliner includes a first seat member. The seat recliner includes a second seat member rotatable relative to the first seat member. The seat recliner includes an input cam member for rotating relative to the first seat member. The seat recliner includes a pivot on the first seat member. The seat recliner includes a follower member for being actuated by the input cam member to lock the second seat member relative to the first seat member. The follower member includes a first side. The first side includes a tooth for meshing with the second seat member. The first side includes an engagement side pivotably engaging on the pivot. The follower member includes a second side in proximity to the engagement side. The seat recliner includes a pair of guides on the first seat member. Guides have the pivot interposed therebetween for cooperating with the pivot to pivotably support the follower member on the pivot. A guide has smaller rigidity than the pivot for retaining the second side.

Preferably, the seat recliner further includes a reinforcement member interconnecting the pivot and the first seat member. The reinforcement member includes a first support face for supporting the follower member.

Preferably, the pivot includes a second support face extending from the reinforcement member for supporting the follower member, the second support face disposed rearward of the first support face.

Preferably, the follower member includes a first engagement face for engaging the first support face. The follower member includes a second engagement face supported for engaging the second support face. The second engagement face is disposed forward of the first engagement face.

Preferably, the first engagement face contacts the first support face. The second engagement face is spaced from the second support face for being brought into contact with the second support face under a force.

Preferably, the guide includes a back-up face to contact with the follower member. The back-up face includes a recess.

Preferably, the back-up face is reduced in contact area with the follower member, so that the guide has smaller rigidity than the pivot.

Preferably, the guide includes a depression positioned differently from the back-up face.

Preferably, the back-up face is spaced away from the follower member.

The second aspect of the invention provides a seat recliner. The seat recliner includes a first seat member. The seat recliner includes a second seat member rotatable relative to the first seat member. The seat recliner includes an input cam member for rotating relative to the first seat member. The reclining mechanism includes a pivot on the first seat member. The seat recliner includes a follower member for actuated by the input cam member to lock the second seat member relative to the first seat member. The follower member includes a first side. The first includes a tooth for meshing with the second seat member. The first side includes an engagement side pivotably engaging on the pivot. The follower member includes a second side in proximity to the engagement side. The seat recliner includes a pair of guides on the first seat member. Guides have the pivot interposed therebetween for cooperating with the pivot to pivotably support the follower member on the pivot. A guide has smaller rigidity than the pivot for retaining the second side. The guide is spaced from the second side for retaining the second side under a force.

Preferably, the follower member includes a third side angularly separated from the first side around the pivot and concentric with the second side for sliding on the guide.

BRIEF DESCRIPTION OF THE ACCOMPANYING DRAWINGS

The above and further objects and novel features of the present invention will more fully appear from the following detailed description when the same is read in conjunction with the accompanying drawings, in which.

DETAILED DESCRIPTION OF THE PREFERRED EMBODIMENTS

Figure 1:
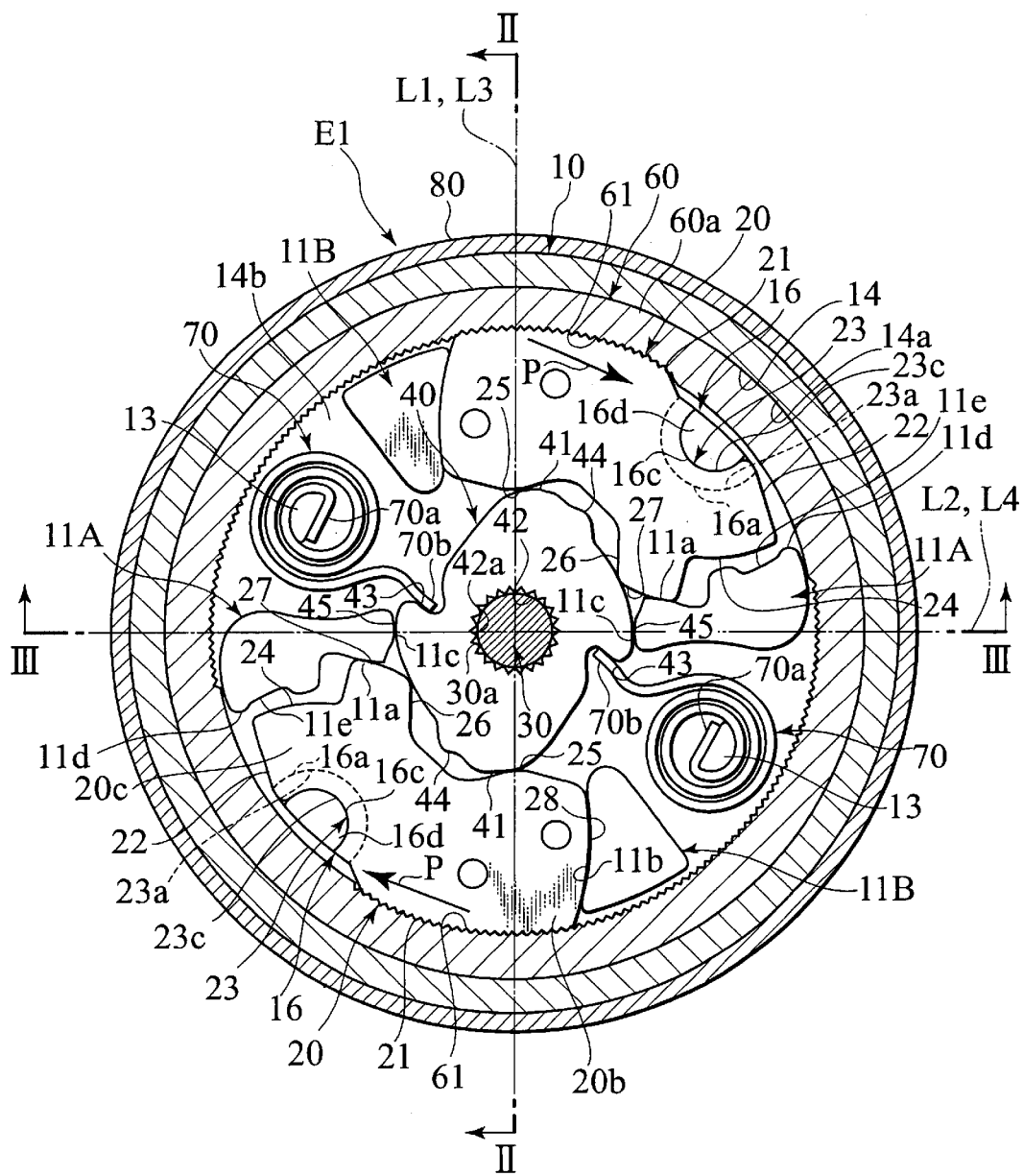
FIG. 1 is an illustrative primary front view showing the seat recliner according to the first embodiment of the invention.
Figure 2:
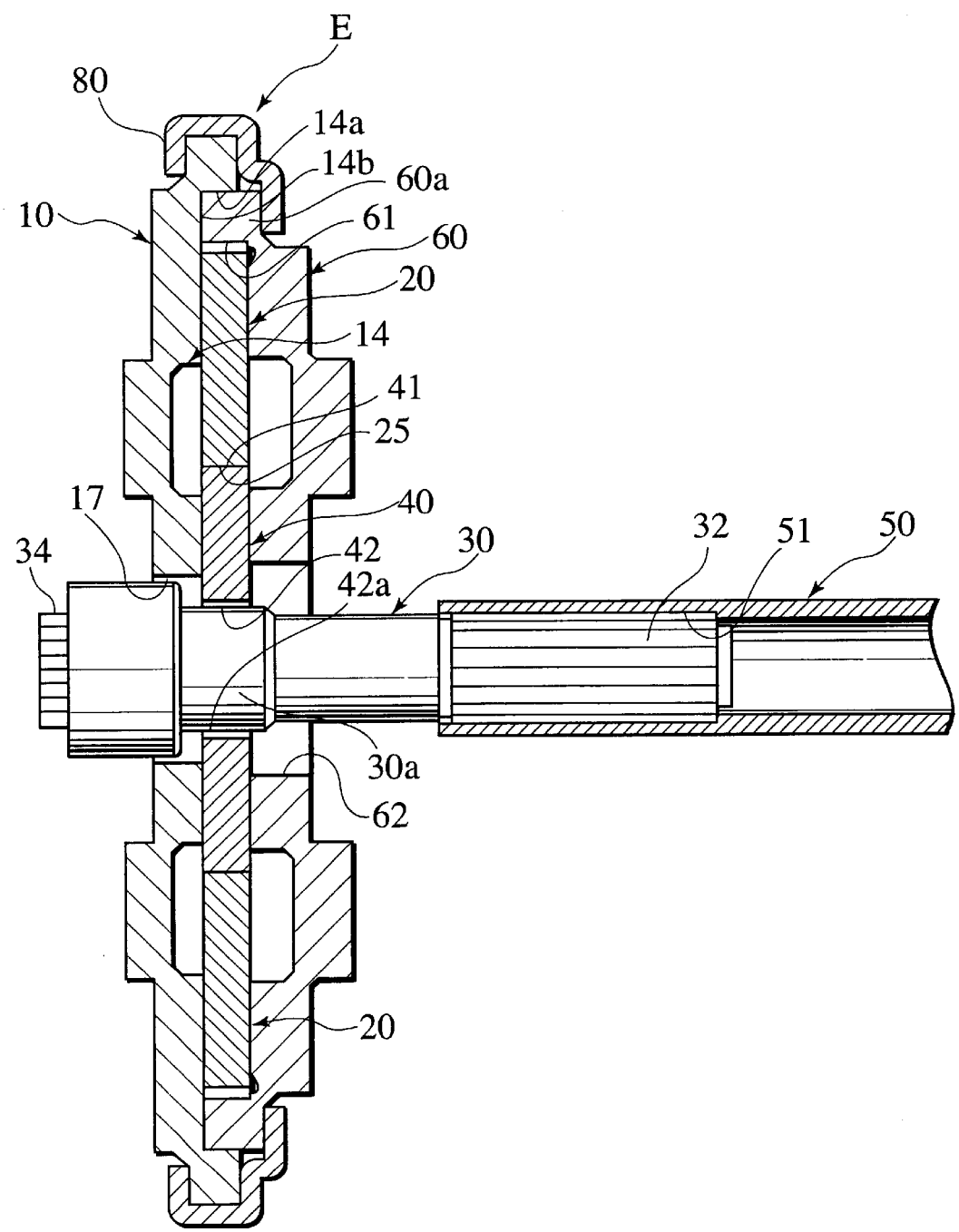
FIG. 2 is an illustrative sectional view taken along the II—II line in FIG. 1.
Figure 3:
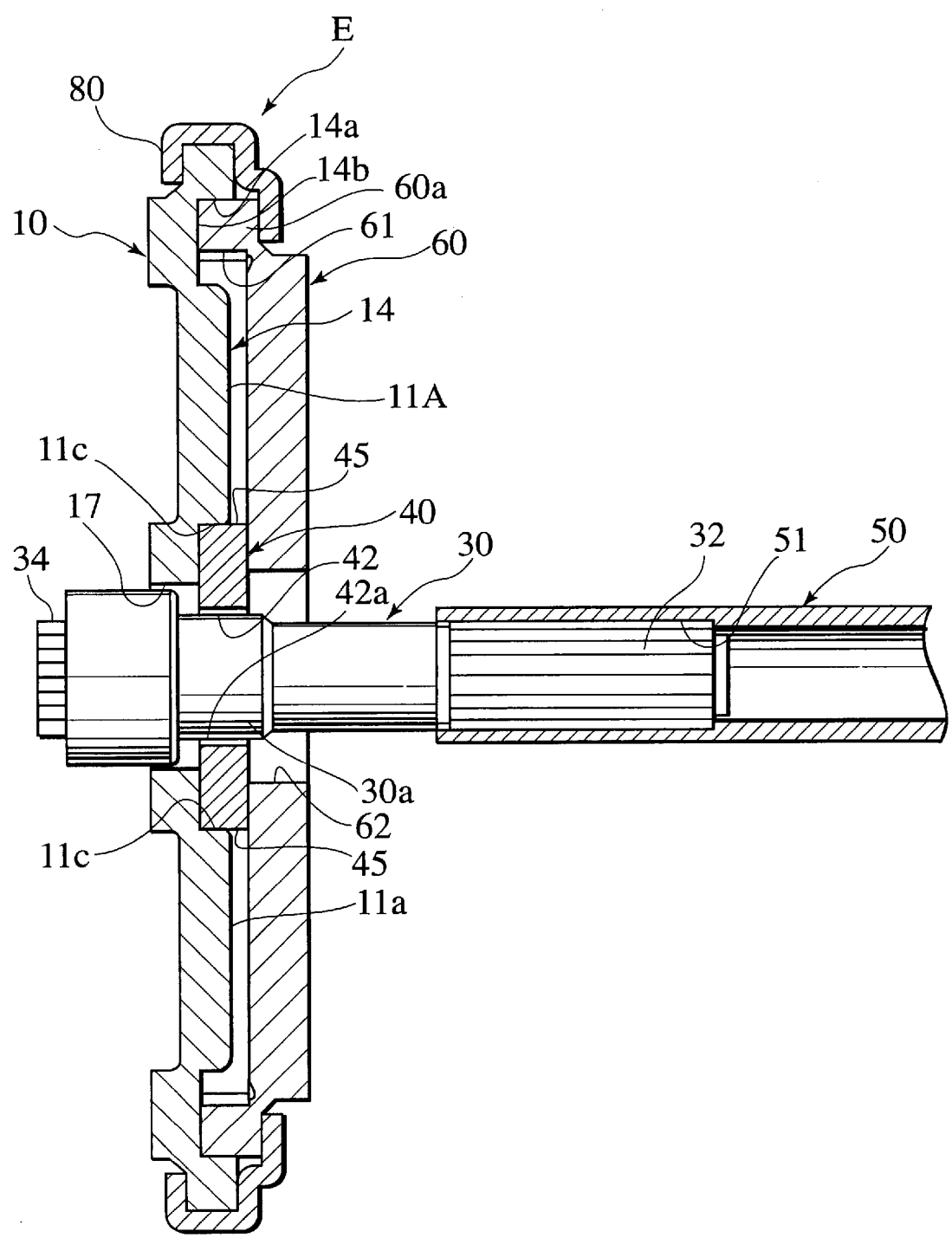
FIG. 3 is an illustrative sectional view taken along the III—III line in FIG. 1.
Figure 4:
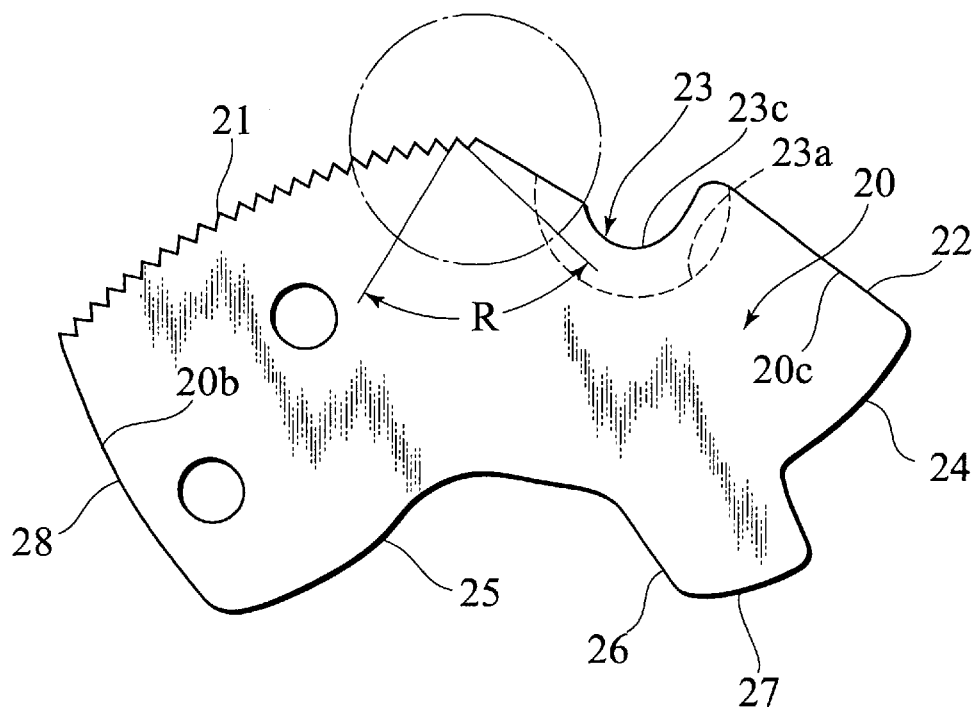
FIG. 4 is an illustrative enlarged front view showing the lock tooth in FIG. 1.
Figure 5:
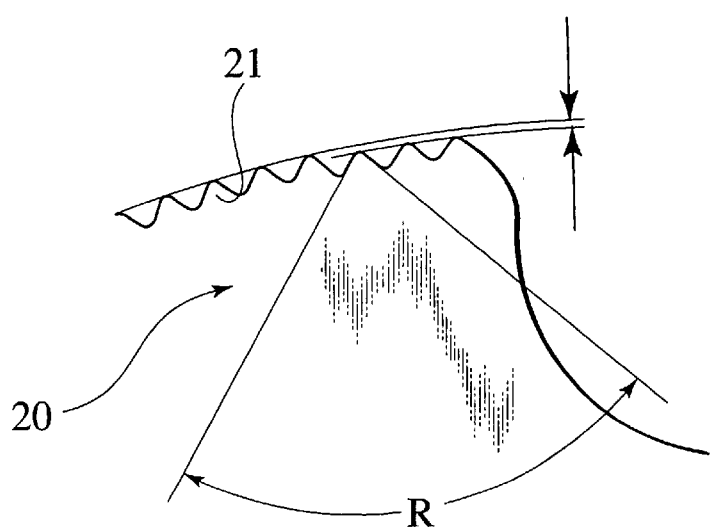
FIG. 5 is an enlarged view showing the portion circled by the dotted V line in FIG. 4.

The preferred embodiments of the present invention will be described below with reference to the accompanying drawings. Like members are designated by like reference characters.

First Embodiment

Seat recliner E1 for a vehicle, as the first embodiment, has frame 10 formed with circular recess 14 having the inner side fitted with recliner E. Recliner E includes lid 60 coaxially rotatable with frame 10. Lid 60 is disposed along inner peripheral face 14a and on the bottom face (standard face) of recess 14. Recliner E includes pivotable lock tooth 20 and rotary cam plate 40 disposed axially between frame 10 and lid 60.

Lid 60 includes two internal gears 61 facing each other along the inner peripheral face. Two lock teeth 20 are mounted on bottom face 14b of frame 10 for pivoting on pivots (support parts) 16. Lock teeth 20 include respective external gears (tooth) 21 meshable with and facing respective internal gears 61. The rotation of cam plates 40 about the rotational center hole 42 in one direction (counterclockwise direction) allows cam plates 40 to push respective two lock teeth 20 in a radially outward direction. The pushing allows external and internal gears to be meshed with each other. The rotation in another direction (clockwise direction) allows the meshing to be disengaged.

One of frame 10 and lid 60 is linked to seat cushion 150. The other is linked to seat back 160. External gear 21 is meshed with internal gear 61. The meshing retains seat back 160 at a predetermined angle relative to seat cushion 150. In the embodiment, frames 10 to be fixed are disposed at respective portions on the both left and right sides in the width-direction of seat cushion 150. Lids 60 are fixed to respective portion on both left and right sides in the width direction of seat back 160. Operation shafts 30 on the both left and right sides are linked to cylindrical shaft 50 by serration (joints) 32 as described later.

Pressed into hole 42 of cam plate 40 is operation shaft 30 to be fixed. Operation shaft 30 includes serrations 32, 34 for transmission of rotational force from outside. Serrations 32, 34 each have a predetermined position (portion) in a rotational direction in correspondence with the position (portion) of frame 10. In the state, operation shaft 30 is pressed into hole 42 of cam plate 40. Serration 32 meshes with serration (joints) 51 formed on the inner side of shaft 50. Serration 34 meshes with serration 35 formed to linkage hole of operation lever 31. Serrations 32, 34 are identical in position, structure of projection and recess (unevenness) in the peripheral direction.

The rotation of cam plate 40 achieves the meshing of external gears 21 with internal gears 61. With predetermined angular positions of serrations 32, 34 corresponding to the positions of frame 10, insertion shaft portion 30a of shaft 30 is pressed into hole 42. Formed to hole 42 is serration 42a. Serration 42a reduces force for the pressing of insertion portion 30a. Serration 42a is effective to securely retain insertion portion 30a after the insertion.

Serrations 32, 51 are linked to each other by the meshing with an angular looseness in a rotational direction. The looseness causes a large force to be exerted from, for example, a belt anchor on one side such as the left side of seat cushion 150. At the time, the deformation of strength members of seat cushion 150 allows shaft 30 at one side to be rotated. The rotation is transmitted to operation shaft 30 at the other side by shaft 50. The looseness is set at a minimum angle to prevent the release of the meshing of external gear 21 and internal gear 61.

Lock teeth 20 are arranged at respective positions angularly apart by 180 degrees in a peripheral direction of frame 10. Lock cam faces 41 are formed at the positions angularly apart by 180 degrees around hole (rotational axis) 42 of cam plate 40. Cam plate 40 includes outer peripheral restriction faces 45, which are positioned on L2 line substantially perpendicular to L1 line connecting respective lock cam face 41 and angularly apart by 180 degrees around center hole 42. Frame 10 includes later-described first guide projections (guide part) 11A, which are positioned on L4 line substantially perpendicular to L3 line connecting respective locked cam face 25 of respective lock teeth 20 and angularly apart by 180 degrees around center hole 42. First guide projections 11A include sliding faces 11C to slide against outer peripheral faces 45. Respective outer peripheral faces 45 are defined by arc-shaped curved faces about center hole 42. Outer faces 45 sliding faces 11c of projections 11A within the rotational range of cam plate 40. Sliding faces 11c are formed as a plane substantially parallel to the line connecting respective cam faces 25. Sliding faces 11c allow cam plate 40 to be moved toward cam faces 25.

Frame 10 includes two semi-cylindrical pivots 16 in the vicinity of internal gears 61 thereon, which pivotably support lock teeth 20. Respective pivots 16 include arced curved parts directed to the rotational center (axis). Lock teeth 20 include semi-circular recessed bearings (portion to be supported) 23, which pivotably engage on arced curved faces of pivots 16. Formed in opposition to external gears 21 relative to bearings 23 are arced retaining faces 24 for sliding, which are coaxial with bearings 23.

Frame 10 includes the first projections 11A, which abut against retaining faces 24 under external force P for extra retention. Relative rotational (tangential) force between frame 10 and lid 60 is exerted on pivots 16 by the meshing of internal gears 61 and external gears 21, and lock teeth 20, thus occurring external force (load) P. First projections 11A have a rigidity against external force P not greater (less) than pivots 16. When a displacement by external force P is transmitted in identical amounts from lock teeth 20 to first projections 11A and to pivots 16, first projection 11A facilitates flex equal to or more than pivots 16.

In the embodiment, Recesses 11e are formed on back-up faces 11d for retaining faces 24. Recesses 11e act to lower first projections 11A in rigidity against external force P. The formation of recesses 11e decreases the area of contact of back-up faces 11d with retaining faces 24, thus lowering first projections 11A in rigidity. Back-up faces 11d are spaced from retaining faces 24 without the exertion of external force P. External force P occurs when the force is exerted on seat back 160 to be moved rearward.

Figure 6:
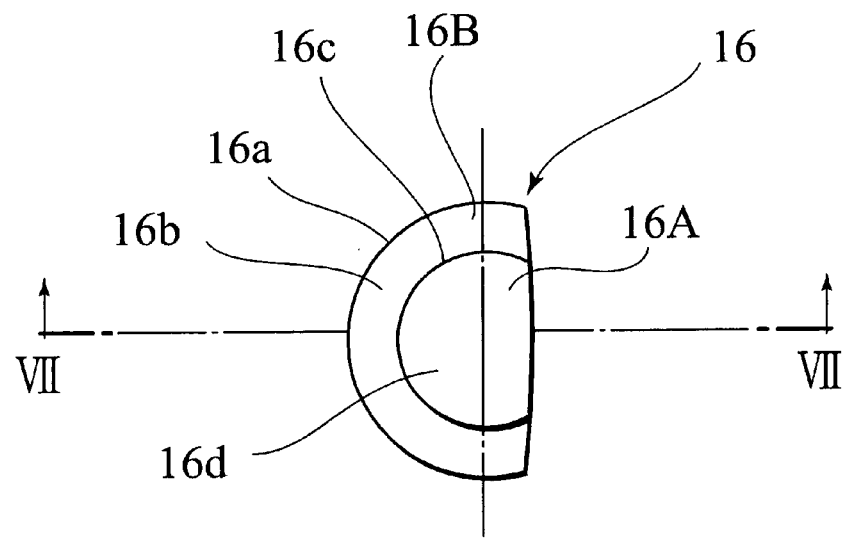
FIG. 6 is an illustrative front view showing the pivot in FIG. 1.
Figure 7:
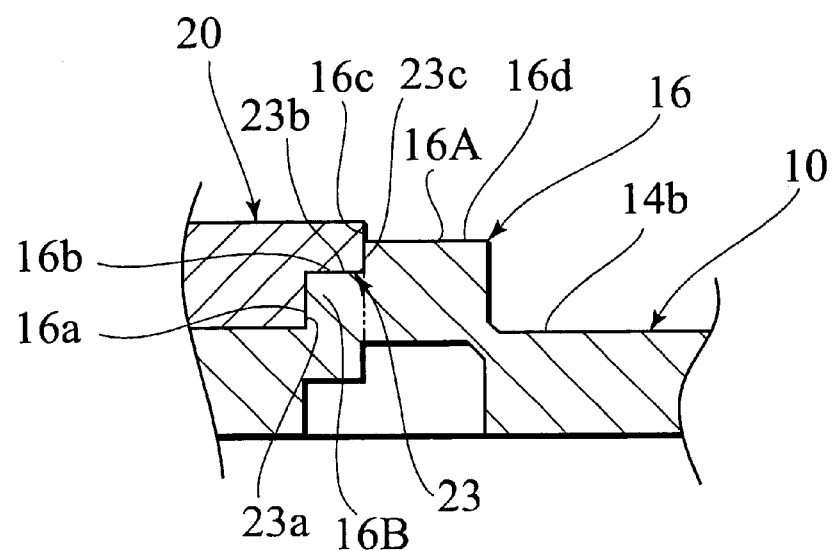
FIG. 7 is an illustrative sectional view of a pivot taken along the VII—VII line in FIG. 6.
Figure 8:
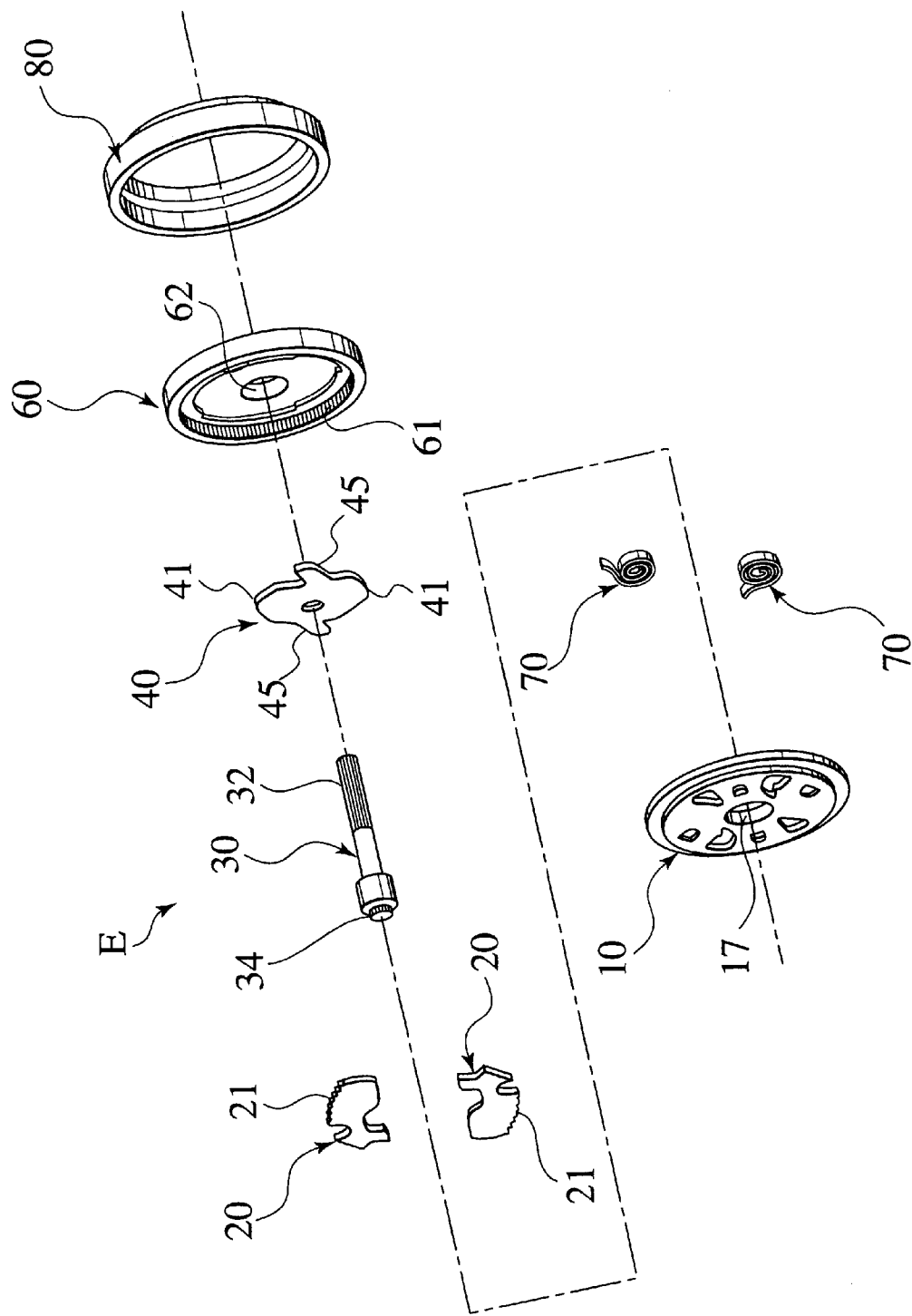
FIG. 8 is an illustrative primary exploded perspective view of the seat recliner in FIG. 1.

In FIGS. 6 and 7, the pivots 16 each include central part 16A and reinforcement part 16B around the central part 16A. The curved faces of pivots 16, or reinforcement parts 16B, include first support faces 16a protruding from bottom face 14a of frame 10. Reinforcement parts 16B include stepped parts 16b formed from the top end of first support faces 16a in parallel with bottom face 14a. The curved faces, or central parts 16A, further include second support faces 16c, which protrude from stepped parts 16b at a right angle in proximity to lid 60. Central parts 16A include top faces 16d formed from the top ends of second support faces 16c in parallel with bottom face 14b. The faces 16a, 16b, 16c, and 16d are formed in a stepped structure. Bearings 23 include first supported faces 23a, which are pivotably supported on first support faces 16a. Bearings 23 include second supported faces 23c, which are pivotably supported on second support faces 16c. The faces 23a, 23c are formed in a stepped structure. Bearings 23 include engagement faces 23b, which are interposed between the faces 23a, 23c and which are engaged with faces 16b. The faces 16a, 16c and faces 23a, 23c are formed in concentric arced curved faces, thus rotatably engaging with each other.

When pivots 16 receive external force from bearings 23, first support faces 16a and first supported faces 23a are brought in contact with each other under a small load. Under a load greater than a predetermined one, in addition to the contact of faces 16a, 23a with each other, second support and supported faces 16c, 23c are established in dimensional relationship to be brought in contact with each other. During small external force P, first faces 16a, 23a contact each other, while second faces 16c, 23c are spaced away from each other.

The following will describe the above-constitution in further detail.

Figure 9:
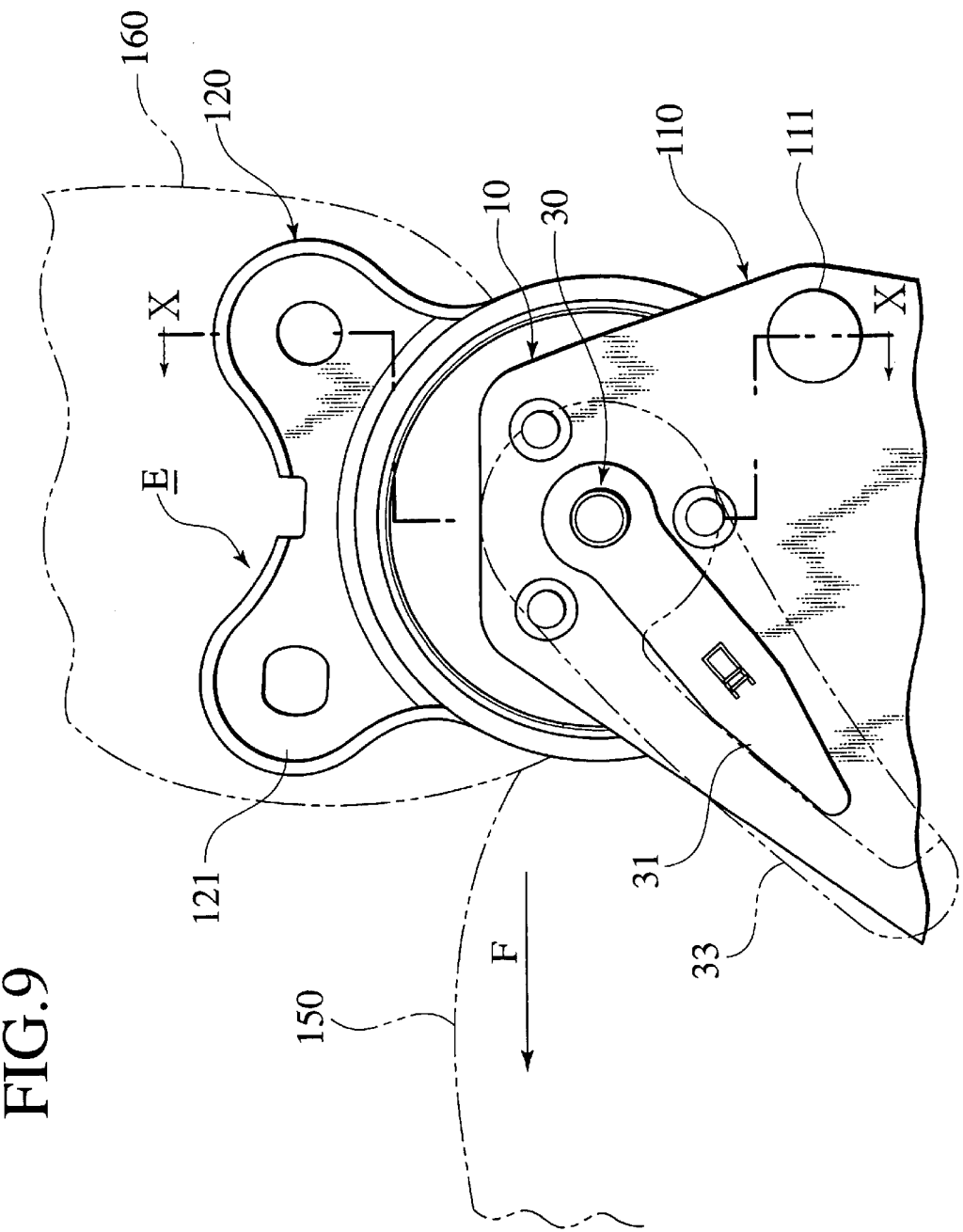
FIG. 9 is an illustrative front view of the seat recliner mounted to a seat.
Figure 10:
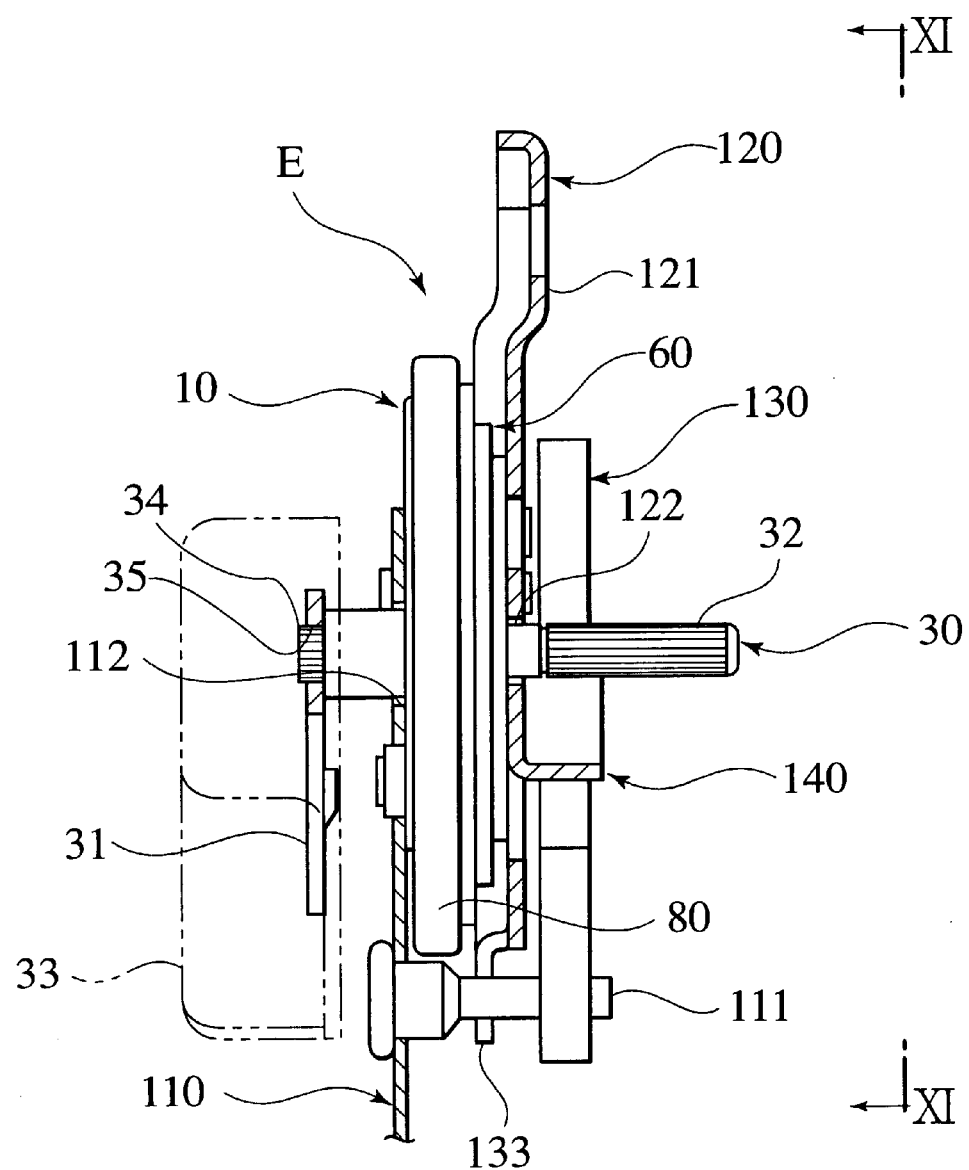
FIG. 10 is an illustrative sectional view taken along the X—X line in FIG. 9.
Figure 11:
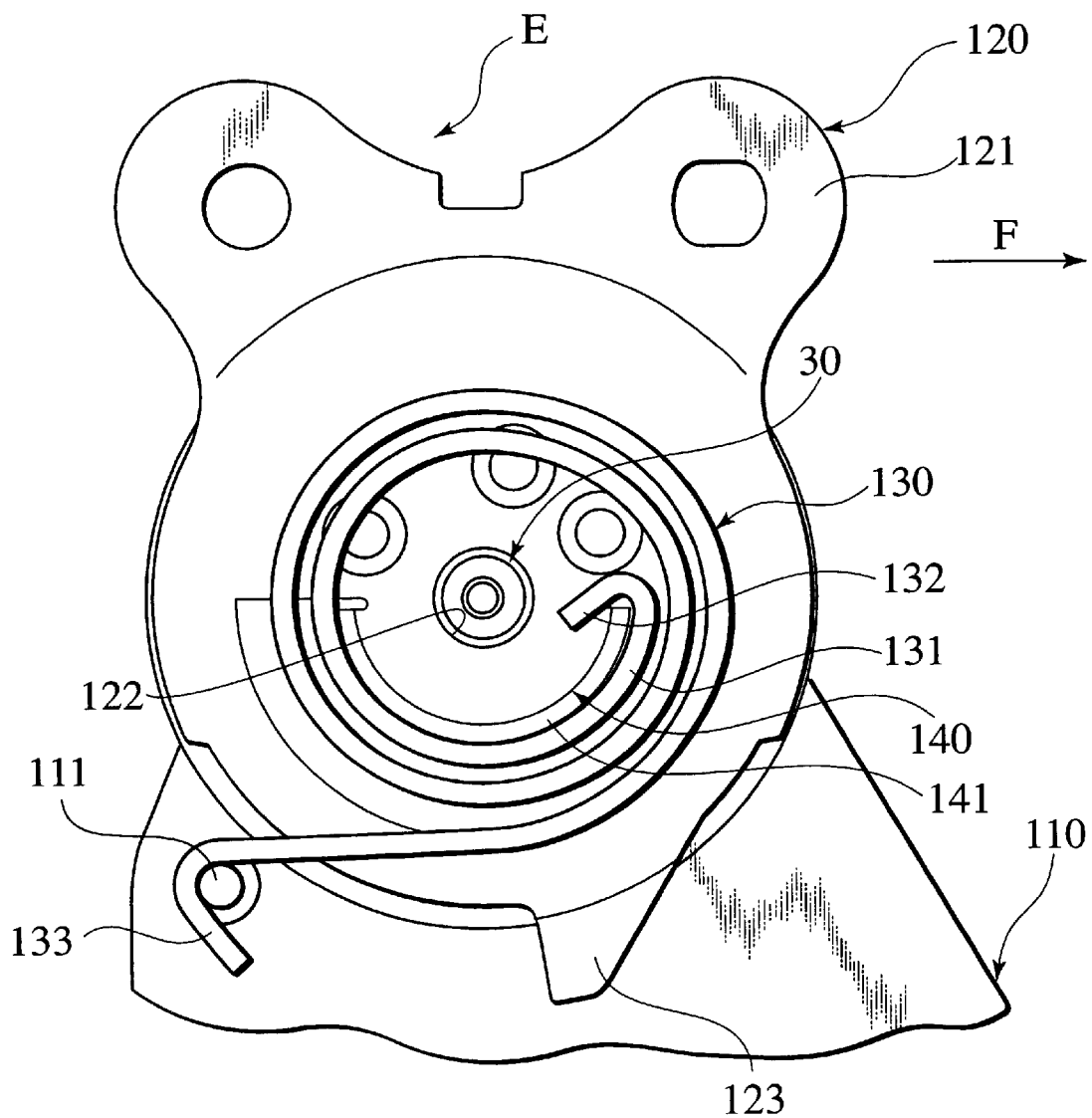
FIG. 11 is an illustrative view directed by the arrows of XI in FIG. 10.

In FIGS. 9 and 11, frame 10 includes an outer side, which is fixed to base plate 110 by welding or bolts. Base plate 110 constitutes one of the strength members of seat cushion 150. Lid 60 includes outer side, which is fixed to arm plate 120 by welding or bolt. Arm plate 120 constitutes one of the strength members of seat back 160. At a coaxial position with frame 10 and lid 60, spiral spring 130 is mounted. Spring 130 biases arm plate 120 in a forward direction (F) to fall seat back 160 down forwardly.

Disc-shaped frame 10 is formed coaxially with circular inner peripheral face 14a in proximity to the outer peripheral face. Frame 10 includes circular recess 14, which has flat circular bottom face 14b as a standard face. Frame 10 is formed with rotational center hole 17, through which operation shaft 30 is inserted at the axial position.

Protruding from the bottom face of recess 14, are two of first guide projections 11A, second guide projections 11B, projections 13, pivots 16. Pivots 16 include the semicircular outer peripheral faces, which engage semicircular bearings 23 of lock teeth 20. The engagements allow lock teeth 20 to be pivotably supported. First guide projections 11A include guide faces 11a, which slidably guide first outer peripheral faces 27 of lock teeth 20 to be pivotably supported on pivots 16. Second guide projections 11B include guide faces 11b, which slidably guide second outer peripheral faces 28 of lock teeth 20 to be pivotably supported on pivots 16. First faces 27 are positioned closer to the center hole 30 than pivots 16. At these positions, the above external force P is not exerted on guide faces 11a. First faces 27 and guide faces 11a guide lock teeth 20 are pivoted on pivots 16. The guide prevents the displacement of lock teeth 20 from pivots 16.

First faces 27, second faces 28, and guide faces 11a, 11b are formed in an arced shape, which are coaxial with bearings 23 about the rotational centers of lock teeth 20 in pivots 16. First guide projections 11A include faces directed toward the rotational center, on which the sliding faces 11c are formed. Projections 11A include faces directed toward faces 24, on which the back-up faces 11d are formed. Retaining faces 24 and back-up faces 11d are formed in an arced shape coaxial with bearing 23.

Projections 13 are disposed between one first and the other second guide projections 11A, 11B and between the other first and one second guide projections 11A, 11B. Projections 13 retain bases 70a of lock springs 70.

Lock springs 70 are formed as a spiral spring. Springs 70 bias cam plate 40 to rotate counter-clockwise in FIG. 1. The biasing of lock spring 70 allows cam plate 40 to be rotated counter-clockwise, causing the normal meshing of external gears 21 with internal gears 61.

First projections 11A, second projections 11B, projections 13, pivots 16 are formed integrally with frame 10 by emboss processing with a press.

Lid 60, as well as frame 10, is formed as a disc. Along the inner peripheral face of rim 60a rotatably fitted into inner peripheral face 14a of frame 10, the above internal gear 61 is formed. At the axis of lid 60, rotational center hole 62 is formed for the insertion of shaft 30.

Lid 60 and frame 10 have outer peripheries, which are held and covered by ring-shaped holder 80. This allows them 60, 10 to be rotatably retained relative to each other without axial separation.

Lock teeth 20 include external gears 21, each of which face internal gears 61 on one side relative to pivot 16. External gears 21 include rear sides with locked cam faces 25 which receive force from lock cam faces 41 of lock teeth 20. Teeth 20 pivot clockwise on pivots 16 to mesh external gears 21 with internal gears 61.

External gears 21 are positioned in proximity to pivots 16. Gears 21, 61 have teeth set at a pressure angle of 60 to 90 degrees. External gears 21 have teeth close to pivots 16 lower in height than the other teeth. The teeth close to pivots 16 have a tip circle larger in radius than the other teeth.

Outer peripheral faces 22, in opposition to external gears 21 relative to pivots 16, are cut flat so as not to contact with internal gears 61. The opposite sides to outer peripheral faces 22 include lock-release cam faces 26 to receive force from lock-release cam faces 44. Teeth 20 receive force from cam faces 44 on cam faces 26. The force allows teeth 20 to be pivoted counterclockwise, thus separating external gears 21 from internal gears 61.

Operation shaft 30 is loosely fitted into respective rotational center holes 17, 62 of frame 10 and lid 60. Shaft 30 is inserted through support holes 112, 122 by loose fitting. Support holes 112, 122 are formed to base and arm plates 110, 120, respectively. Shaft 30 includes serration 35 projecting outward from base plate 110. Serration 32 projects outward from arm plate 120. Serration 35 has operation lever 31 mounted to it, to which operation knob 33 is further mounted.

The pressing of pressing-into pivots 30a of shaft 30 into center holes 42 allows cam plates 40 to be fixed. Cam plates 40 have outer peripheral faces formed with two cam faces 41, 44, respectively. The outer peripheral faces are formed with locking parts 43, which lock with outer end sides 70b of springs 70.

Lock springs 70 each include a spiral spring. Springs 70 include bases 70a retained by projections 13. Springs 70 include outer ends 70b latched with locking parts 43 of cam plates 40. Outer ends 70b bias against cam plate 40 to be rotated counterclockwise in FIG. 1. Cam plate 40 includes two axially symmetrical locking parts 43 which effectively receive biasing force tangentially from two springs 70.

Arm plate 120 includes mounting part 121 to seat back 160. Arm plate 120 includes retaining member 140 for retaining inner part 131 of spring 130 in FIG. 11.

Retaining member 140 is provided in the lower part relative to rotational center hole 122 of arm plate 120. Arm plate 120 is cut and raised along a locus with a radius of curvature about center hole 122, to form retaining member 140. Cut and raised part 141 includes an end with a recess (not shown in Figs.), which is locked with inner end 132 of spiral spring 130.

Spring 130 includes outer end 133, which is latched with locking pin 111 provided to base plate 110. Spring 130 biases against arm plate 120 to normally rotate in a forward direction (F).

In FIG. 11, when arm plate 120, or seat back 160, rotates in the forward direction of F, stopper 123 for the prevention of falling forward abuts against pin 111. The abutment restrains the forward (F) rotation of seat back 160. Without being limited to the embodiment, arm plate 120 may be mounted to frame 10 and lid 60 may be mounted to seat cushion 150 in contrast with the above structure.

Next, the operation and benefit of the seat recliner E for a vehicle will be described.

At the assembly of seat recliner E, mounted to frame 10 are cam plate 40 and springs 70. In this state, the biasing force of springs 70 allows outer ends 70b to be engaged with sliding faces 11c of projections 11A, not with locking parts 43.

By use of a shaft-shaped holding fixture with a serration (not shown in Figs.), which is meshed with serration 42a of center hole 42, cam plate 40 is rotated clockwise. The rotation allows locking parts 43 to be engaged with outer ends 70b of springs 70. In this state, lock teeth 20 are installed to frame 10, and lid 60 is fitted into recess 14. With the serration of holding fixture inserted into center hole 42 being rotated clockwise, cam faces 44, 26 rotate teeth 20 counterclockwise. The rotation allows external gears 21 to be moved radially inward relative to (imaginary) internal gear 61 of lid 60. The insertion of rim 60a between inner peripheral face 14a of frame 10 and external gears 21 of lock teeth 20, allows lid to be fitted into recess 14. By the removal of force from the holding fixture, the biasing force of springs 70 allows lock teeth 20 to be pivoted clockwise via cam plate 40. The pivotal motion allows external gears 61 to be meshed with internal gears 21. Lock teeth 20 pivot clockwise until the external and internal gears 21, 61 finish mating with each other. After the mounting of lid, the holding fixture is removed.

Next, the outer peripheral faces of lid 10 and lid 60 are covered with holder 80. The cover allows frame 10 and lid 60 to be rotatably supported relative to each other, without axial separation.

After the assembly with all of frame 10, lock teeth 20, cam plate 40, lid 60, spring 70, and holder 80, serrations 32, 34 are positioned on frame 10 in a rotational direction. In this state, portion 30a of shaft 30 is pressed into center hole 42.

Assembled recliner E is mounted to both left and right sides of a seat in position. In mounting, respective serrations 32 of shafts 30 are mated with serrations 51 of shafts 50.

In a driver's seat, serration 34 of shaft 30 located on the right side of the seat (door side) is mated with serration 35 of operation lever 31. A bolt (not shown) fixes lever 31 to shaft 30. In an assistant driver's seat, mounted to shaft 30 located on the left side of the seat (door side) is operation lever 31.

In recliner E assembled to a seat, in FIG. 1, cam plate 40 normally is rotated counterclockwise by springs 70 under biasing force. Lock cam faces 41 press against cam faces 25 of teeth 20. This pressing allows teeth 20 to be pivoted clockwise on pivots 16. The pivotal motion allows external gears 21 to be meshed with internal gears 61, thus preventing the rotation of seat back 160. In this state, lines L1 and L2 or lines L3 and L4 overlap each other substantially in FIG. 1, respectively.

The knob 33 of lever 31 operatively rotates clockwise shaft 30. The cam faces 41, 25 are disengaged. Cam faces 44 press against cam faces 26.

Thus, teeth 20 pivot counterclockwise on pivots 16. The pivotal motion releases the meshing of gears 21, 61 for disengagement. Arm plate 120 or seat back 160 is rotated forward (F) by spring 130 under biasing force.

To return a locking state returns from a lock disengagement state, knob 33, gripped at an angular position to incline seat back 160, is operatively released. Springs 70 rotate cam plate 40 counterclockwise under a biasing force. The rotation allows teeth 20 to be rotated clockwise. The rotation allows gears 21, 61 to be meshed with each other for a locking state.

According to recliner E, the maximum load due to the external force P is exerted on the connecting portion of first support face 16a and bottom face 14b. The connecting portion corresponds to the base of pivot 16. The formation of pivot 16 in a stepped shape including first and second support faces 16a, 16c allows for a large contact area between first support face 16a and frame 10. The minimizing of second support faces 16c to less than first support face 16a reduces the contact area of pivot 16 with tooth 20. Thus, the raising of contact pressure to greater than external force P reduces the strength. Second face 23c projects from first support face 23a toward pivot 16. In this state, first support face 23a is structured as a rib. In this structure, fist faces 16a, 23 enlarge in radius to enlarge the contact face, thus restraining the lowering in strength to a minimum. The lowing of strength due to the reduction of the contact face with tooth 20 is restrained to a minimum, thus improving pivot 16 in strength.

Pivot 16 is formed as a projection by embossing processing with a press. When the formation method is employed for straight shaped pivot 16, in relation to energy supplied to a press, the enlargement of the connection area between pivot 16 and frame 10, or the area of the portion of pivot 16 projecting from bottom face 14b, disadvantageously reduces pivot 16 in height. If pivot 16 is established at a height identical to the thickness of tooth 20, the upper limit of the connection area between pivot 16 and frame 10 may be automatically determined. The determination does not further increase the connection area.

In the embodiment, stepped pivot 16 enlarges the connection area allows the connection area between first support face 16a and frame 10 to be enlarged without thickening frame 10. Thus, when an embossing processing forms pivot 16, the pressure of a press is identical to conventional one. Frame 10 employs one of identical thickness, and the costs of die and manufacturing is cheapened to allow forming at productive costs identical to conventional ones.

In the embodiment, in accordance with external force P, firstly, first faces 23a are brought into contact with first faces 16a. Secondly, second faces 23c are brought in contact with second faces 16c. With the fitting allowance between first faces 16a, 23a or between second faces 16c, 23c, first faces 16a previously contact with first faces 23a. Excessive load is not exerted on second faces 16c of a smaller strength. This ensures safety. In addition, if external force is further increased, second faces 16c support lock teeth 20, and thus pivots 16 advantageously bear the high load.

The embodiment has recliners E mounted to both left and right sides of the seat. Recliner E may be provided on one of the sides of the seat.

The embodiment has stepped pivots 16. The guide faces 11b of second guide projections 11B and the second peripheral faces of lock teeth 20 may be formed in a step structure, respectively. In such a case, locking strength against the external force in a reverse direction relative to the external force P is improved.

Second Embodiment

Figure 12:
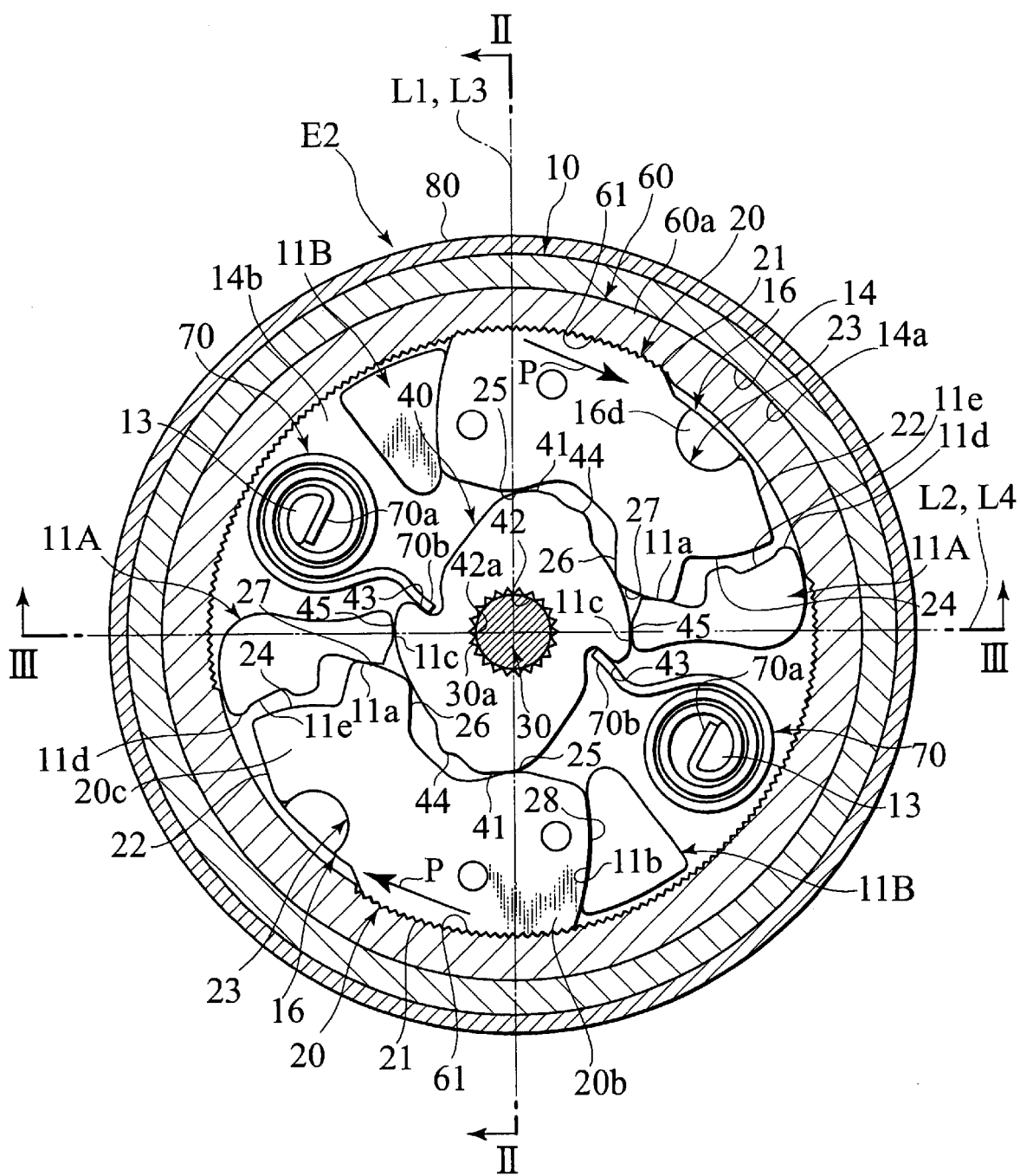
FIG. 12 is an illustrative primary front view showing the seat recliner according to the second embodiment of the invention.
Figure 13A:
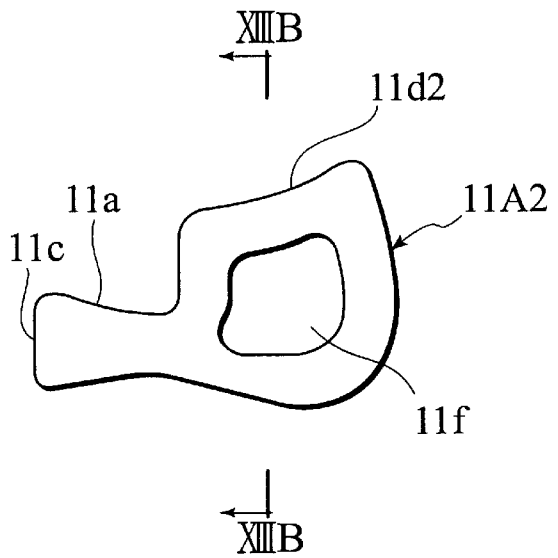
FIG. 13A is an illustrative primary front view of the first guide projection according to the second embodiment of the invention.
Figure 13B:
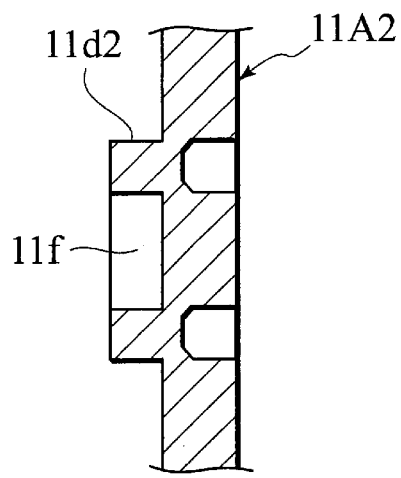
FIG. 13B is an illustrative sectional view taken along the XIIB—XIIB in FIG. 12A.

In FIG. 12, recliner E2 has frame 10. Frame 10 includes two semi-cylindrical pivots 16 in proximity to internal gears 61 thereon, which pivotably support lock teeth 20. Lock teeth 20 include semi-circular recessed bearings 23. Bearings 23 pivotably engage on the arced curved faces of pivots 16. Teeth 20 include arced retaining faces 24 for sliding coaxially with bearings 23. Retaining faces 24 are positioned opposite to external gears 21 relative to bearings 23.

Frame 10 is formed in a disc-shape. Circular inner peripheral face 14a is formed coaxially with and close to the outer periphery, which forms circular recess 14. Frame 10 includes rotational center hole 17 on the axis for the insertion of shaft 30.

According to the recliner E2, first projection 11A has less rigidity against external force P than pivot 16. When the external force P is exerted on first projection 11A and pivot 16 from lock tooth 20, the repulsive force on first projection 11A from lock tooth 20 is smaller than one on lock tooth 20 from pivot 16. Thus, internal stress occurring on lock tooth 20 becomes small. External force P to be exerted on external gear 21 from internal gear 61 prevents the damage on bearing 23 of lock tooth 20. This optimizes the balance of rigidity between first projection 11A, pivot 16 and tooth 20. Pivot 16 and first projection 11A retain tooth 20 at a predetermined strength, thus improving whole strength. The reduction of force on tooth 20 allows thinning of tooth 20 or employing a general-purpose material at lower cost, thus reducing productive cost.

The recess 11e of back-up face 11d lowers the rigidity of first projection 11A against external force P. In the embodiment, recess 11e reduces the area of back-up face 11d to abut against retaining face 24. The reduction of the area of back-up face 11d effectively reduces the rigidity of first projection 11A. In addition, back-up face 11d is separated away from retaining face 24 without external force P. In this state, when increment of external force P needs back-up, back-up face 11d abuts against retaining face 24 to back up pivot 16. Thus, in a small external force P, retaining face 24 does not abut against back-up face 11d. In the case of large external force P, after the abutment of back-up face 11d against retaining face 24, the deformation of first projection 11A is reduced. At the maximum external force P, the force, exerted on first projection 11A from tooth 20 is reduced. Thus, the internal stress, exerted on tooth 20 by first projection 11A, is reduced remarkably, thus reducing productive cost.

Third Embodiment

The third embodiment will be described in reference with FIGS. 13A, 13B, 14A, and 14B. Other parts except for first guides 11A2, 11A3 are common with the second embodiment.

First guide projection 11A2 includes recess 11f behind back-up face 11d2 for retaining face 24. Back-up face 11d has no recess 11e of the first embodiment, and is formed as an arced curved face identical to retaining face 24. First projection 11A may include sliding face 11C as described in the first embodiment.

In the recliner, recess 11f reduces the rigidity of first projection 11A against external force P. Back-up face 11d2 tends to be easily resiliently deformed backward by the external force that is received from retaining face 24 (refer to FIG. 12). The lowering of the repulsive force to be exerted on retaining face 24 from back-up face 11d allows for improvement in strength as in the first embodiment.

Figure 14A:
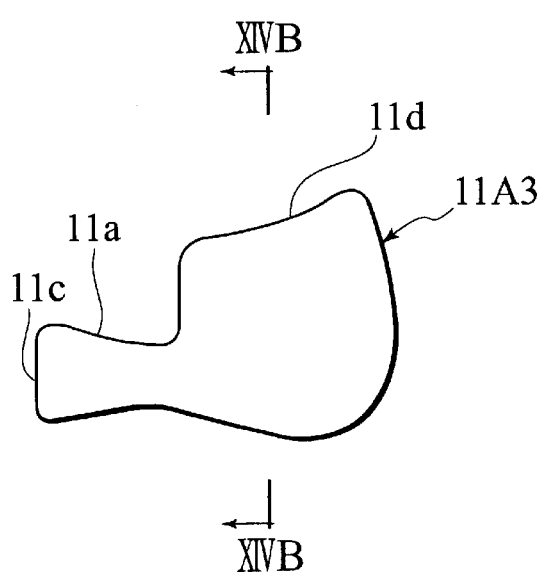
FIG. 14A is a front view showing the first projection of another embodiment which aims to reduce rigidity.
Figure 14B:
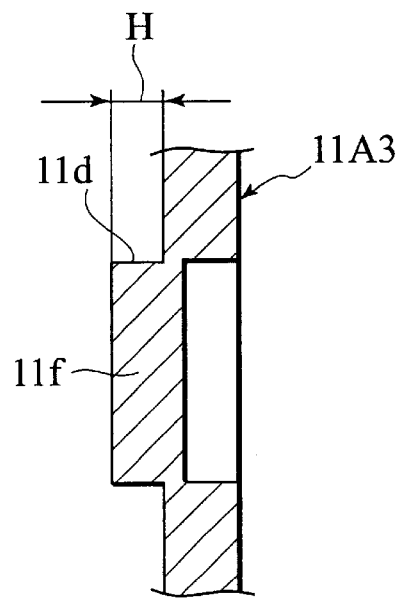
FIG. 14B is an illustrative sectional view taken along XIIIB—XIIIB line in FIG. 13A.

According to the embodiments, the formation of recess 11e on back-up face 11d, the reduction of the area of back-up face 11d, and the providing of recess 11f behind back-up face 11d2, reduce the rigidity of first projection 11A2 against external force P. As shown in FIGS. 14A and 14B, first projection 11A3 may be lowered in height H to reduce in rigidity.

The entire contents of Japanese Patent Applications P2001-155659 and P2001-155749 (all filed on May 24, 2001) are incorporated herein by reference.

While preferred embodiments of the present invention have been described using specific terms, such description is for illustrative purposes, and it is to be understood that changes and variations may be made without departing from the spirit or scope of the following claims.

What is claimed is:

1. A seat recliner comprising:
   a first seat member;
   a second seat member rotatable relative to the first seat member;
   an input cam member for rotating relative to the first seat member;
   a pivot on the first seat member;
   a follower member for being actuated by the input cam member to lock the second seat member relative to the first seat member,
   the follower member comprising:
      a first side including:
         a tooth for meshing with the second seat member; and
         an engagement side pivotably engaging on the pivot; and
         a second side in proximity to the engagement side; and
   a plurality of guides on the first seat member, the guides having the pivot interposed therebetween for cooperating with the pivot to slidably and pivotably support the follower member on the pivot, one of the guides having smaller rigidity than the pivot for retaining the second side.

2. The seat recliner according to claim 1, further comprising: a reinforcement member interconnecting the pivot and the first seat member, the reinforcement member including a first support face for supporting the follower member.

3. The seat recliner according to claim 2, wherein the pivot comprises a second support face extending from the reinforcement member for supporting the follower member, the second support face disposed rearward of the first support face.

4. The seat recliner according to claim 3, wherein the follower member comprises:
   a first engagement face for engaging the firs support face; and
   a second engagement face supported for engaging the second support face, the second engagement face disposed forward of the first engagement face.

5. The seat recliner according to claim 4, wherein the first engagement face contacts the first support face, and the second engagement face is spaced from the second support face for being brought into contact with the second support face under a force.

6. The seat recliner according to claim 1, wherein one of the guides includes a back-up face to contact with the follower member, the back-up face including a recess.

7. The seat recliner according to claim 6, wherein the back-up face is reduced in contact area with the follower member, so that one of the guides has smaller rigidity than the pivot.

8. The seat recliner according to claim 6, wherein one of the guides include a depression positioned differently from the back-up face.

9. The seat recliner according to claim 6, wherein the back-up face is spaced away from the follower member.

10. A seat recliner comprising:
   a first seat member;
   a second seat member rotatable relative to the first seat member;
   an input cam member for rotating relative to the first seat member;
   a pivot on the first seat member;
   a follower member for being actuated by the input cam member to lock the second seat member relative to the first seat member,
   the follower member comprising:
      a first side including:
         a tooth for meshing with the second seat member; and
         an engagement side pivotably engaging on the pivot; and
      a second side in proximity to the engagement side; and
   a plurality of guides on the first seat member, the guides having the pivot interposed therebetween for cooperating with the pivot to pivotably support the follower member on the pivot, wherein one of the guides having smaller rigidity than the pivot is spaced away from the second side when not under force and retains the second side when the second side abuts against the one of the guides under force.

11. The seat recliner according to claim 10, wherein the follower member includes a third side angularly separated from the first side around the pivot and concentric with the second side for sliding on one of the guides.

* * * * *